United States Patent Office 3,462,424
Patented Aug. 19, 1969

1

3,462,424
PROCESS FOR PREPARING ESTRONE AND THE
INTERMEDIATES OBTAINED THEREFROM
Gunther Kruger, St. Laurent, Montreal, Quebec, and David
J. Marshall, Hampstead, Montreal, Quebec, Canada, assignors to American Home Products Corporation, New
York, N.Y., a corporation of Delaware
No Drawing. Filed Mar. 20, 1967, Ser. No. 624,240
Int. Cl. C07c 169/24
U.S. Cl. 260—239.55                    7 Claims

ABSTRACT OF THE DISCLOSURE

There is disclosed herein a process for preparing estrone from 6,19-oxido-4-androstene-3,17-dione via the novel intermediate 3-acetoxy - 6,19 - oxidoandrosta - 2,4-dien-17-one, 3,19-diacetoxyandrosta-2,4,6 - trien-17 - one and 3,17,19-triacetoxyandrosta-2,4,6,16-tetraene, 19-acetoxyandrosta-1,4,6-triene-3,17-dione and the known compound 6-dehydroestrone.

---

The present invention relates to a process for preparing estrone. Estrone is a naturally occurring estrogen well-known for its high potency and for its usefulness in clinical practice.

It is a particular advantage of the process of this invention that it permits the preparation of estrone by a convenient and efficient method starting from easily available materials, without isolation or purification of any intermediates.

In principle, our process for preparing estrone follows the route described below:

6,19-oxido-4-androstene-3,17-dione (I) which is easily available from dehydroisoandrosterone according to the procedure described by K. Heusler et al. in Experientia, vol. 18, p. 464 (1962), is treated with isopropenyl acetate in the temperature range of from room temperature to the boiling temperature of the mixture, for periods of time from 16 hours to 4 days at room temperature, or from 10 minutes to 4 hours at the boiling temperature of the mixture. Minor amounts of an acid catalyst have to be present, such as, for example, from 0.01 to 0.2 part per part of starting material of p-toluenesulfonic acid or sulfuric acid.

The first product of the above reaction is the 3-enol acetate of the starting material, 3-acetoxy-6,19-oxidoandrosta-2,4-dien-17-one (II). If desired, that compound may be isolated, preferably by chromatography. Continued treatment of that latter with isopropenyl acetate in the presence of an acid catalyst as referred to above, or continuation of the initial reaction without isolation of said last-named compound, opens the 6,19-oxido bridge. A mixture is obtained which contains approximately 10 to 20 percent of estrone acetate (VI), the remainder of the mixture consisting of 3,19-diacetoxyandrosta-2,4,6-trien-17-one (IIIa) and of the 17-enol acetate of said last-named compound, 3,17,19-triacetoxyandrosta-2,4,6,16-tetraene (IIIb). The individual constituents of the above mixture may be separated preferably by chromatography, and may be isolated if desired. If such separation is carried out, estrone acetate may be hydrolysed in an acid or alkaline medium to yield estrone.

It is suprising and unexpected that estrone acetate should be formed under the conditions of the above reaction. Its formation may be explained by assuming that in the opening of the 6,19-oxido bridge of 3-acetoxy-6,19-oxidoandrosta-2,4-dien-17-one (II) a proton is lost from the 1-position rather than from the 7-position, thus forming a double bond in position 1,2-rather than in position 6,7 such as, present in compounds IIIa and IIIb. The hypothetical intermediate 3-acetoxy-19-hydroxyandrosta-1,3,5-trien-17-one, would then be expected to aromatize spontaneously, with expulsion of the 19-hydroxymethyl group as formaldehyde to yield estrone acetate.

The other two main constituents of the above mixture, 3,19-diacetoxyandrosta-2,4,6-trien-17-one, (IIIa) and its 17-enol acetate, 3,17,19-triacetoxyandrosta-2,4,6,16-tetraene (IIIb) are treated at room temperature with dichlorodicyanoquinone to yield principally 19-acetoxyandrosta-1,4,6-triene-3,17-dione (IV). It is another particular advantage of the process of this invention that the introduction of the double bond in position 1,2 may be effected under much milder conditions than are necessary to carry out the same reaction with related $\Delta^4$-3-ketones, and with much less formation of undesirable by-products.

19-acetoxyandrosta-1,4,6-trien-3,17-dione (IV) may be isolated if desired; upon treatment with an acid or a base it aromatizes readily to yield 6-dehydroestrone (V) which may then be reduced, preferably by means of hydrogen in the presence of a noble metal catalyst, to yield estrone.

It is a particular advantage of the process of this invention that it permits carrying out of all the above reactions without isolating or purifying any intermediates whatsoever, and in a preferred embodiment of this invention, we proceed as follows: 6,19-oxido-4-androstene-3,17-dione is refluxed for approximately 30 minutes with approximately two parts of isopropenyl acetate and approximately 0.1 part of p-toluene sulfonic acid per part of starting material. The reaction mixture is cooled, diluted with benzene, and the catalyst removed by extraction with water. The remaining solution or its residue obtained upon evaporation containing mainly a mixture of 3,19-diacetoxyandrosta-2,4,6-trien-17-one and of its corresponding 17-enol acetate, 3,17,19-triacetoxyandrosta-2,4,6,16-tetraene, and estrone acetate containing also a certain amount of the corresponding 17-enol acetate, is diluted or dissolved in an inert solvent, not affected by the reagent, such as, for example, benzene, ethyl acetate, isopropenyl acetate, methylene dichloride, diethyl ether, tetrahydrofuran or mixtures thereof, treated at room temperature for approximately one hour with approximately 0.9 part of dichlorodicyanoquinone per part of starting material. The reaction mixture is cooled, filtered from precipitated dichlorodicyanoquinone, extracted with water and evaporated, to yield a mixture now containing mainly 19-acetoxyandrosta-1,4,6-trien-3,17-dione and estrone acetate. That latter mixture is treated at room temperature with an alkali metal hydroxide or alkoxide in a lower alkanol preferably methanolic sodium hydroxide, neutralized with acid, preferably acetic acid, concentrated, diluted with water, and filtered to yield a mixture consisting principally of 6-dehydroestrone and estrone. The last-named mixture is hydrogenated, preferably in the presence of palladium catalyst, to yield estrone, identical with an authentic sample.

The following formulae in which Ac represents the acetyl group, and examples will illustrate this invention.

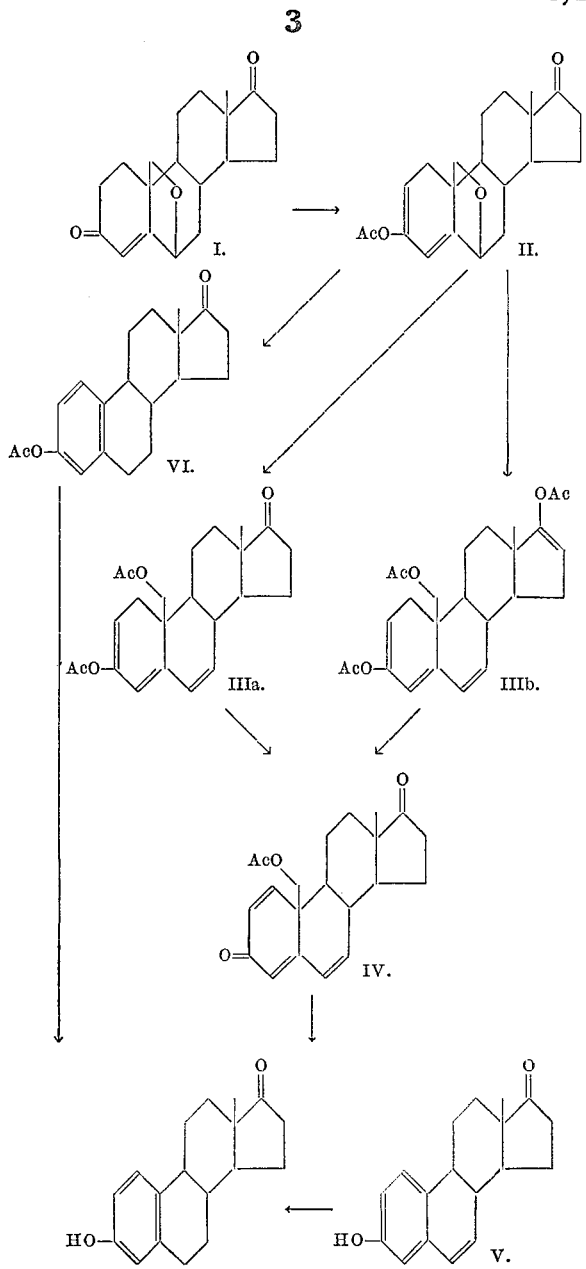

EXAMPLE 1

3-acetoxy-6,19-oxidoandrosta-2,4-dien-17-one

A solution of 10 g. of 6,19-oxidoandrost-4-en-3,17-dione in 20 ml. of isopropenyl acetate is heated at 90° with 1.0 g. para-toluenesulfonic acid under nitrogen for 10 minutes. The mixture is cooled, diluted with 40 ml. of benzene, extracted five times with 10 ml. of water and evaporated. Chromatography of the crude product on silica gel gives, upon elution with ethyl acetatebenzene 1:4, the title compound $\lambda_{max.}^{MeOH}$ 264 m$\mu$

EXAMPLE 2

3,19-diacetoxyandrosta-2,4,6-trien-17-one

A solution of 0.1 g. of 3-acetoxy-6,19-oxidoandrosta-2,4-dien-17-one obtained as described in Example 1, in 2.0 ml. isopropenyl acetate is heated at 90° with 10 mg. of para-toluenesulfonic acid in an atmosphere of nitrogen for 30 minutes. The mixture is diluted with 4 ml. of benzene extracted with water and evaporated. Chromatography on silica gel gives, upon elution with ethyl acetate-benzene 1:4, the title compound $\lambda_{max.}^{MeOH}$ 299 m$\mu$

EXAMPLE 3

Estrone acetate

In the same manner as described in Example 2, and from the same chromatography separation, estrone acetate is obtained identical with an authentic sample.

EXAMPLE 4

3,17β,19-triacetoxyandrosta-2,4,6,16-tetraene

In the same manner as described in Examples 2 and 3, but heating the reaction mixture for 3.5 hours, cooling, diluting with 40 ml. of benzene, extracting with water and evaporating, stirring the residue with 80 ml. of methanol at 0° for 2 hours, filtering the precipitate and recrystallizing from methanol yields the title compound, M.P. 164–165.5° identified by elemental analysis, and by ultraviolet, infrared and NMR spectrography.

EXAMPLE 5

19-acetoxyandrosta-1,4,6-trien-17-one

A solution of 0.5 g. of 3,19-diacetoxyandrosta-2,4,6-trien-17-one, obtained as in Example 2, in 4 ml. of ether-tetrahydrofuran 3:2 is left at room temperature with 0.45 g. of dichlorodicyanoquinone for one hour and then at −50° for 2 hours. Filtration, extraction of the filtrate with water, evaporation and chromatography of the residue on silica gel gives, upon elution with ethyl acetate-benzene 1:4, the title compound $\lambda_{max.}^{MeOH}$ 222, 256 and 298 m$\mu$

EXAMPLE 6

6-Dehydroestrone

A solution of 0.4 g. of 19-acetoxyandrosta-1,4,6-trien-17-one obtained as described in Example 4, in 2.0 ml. of methanol is left to stand wtih 0.04 g. of sodium methoxide for one hour at room temperature. Neutralization with glacial acetic acid, followed by evaporation of part of the solvent, filtration, and recrystallization of the precipitate gives the title compound, M.P. 255–262°, identical with an authentic sample by infrared spectrography.

In the same manner, but using 0.04 ml. of perchloric acid (2.0 ml.) in methanol instead of solution methoxide, and extending the reaction time from 1 hour to 2 days at room temperature the title compound is also obtained.

EXAMPLE 7

Estrone

A solution of 10 g. of 6,19-oxidoandrost-4-en-3,17-dione in 20 ml. of isopropenyl acetate is heated at 90° with 1.0 g. of para-toluene sulfonic acid under nitrogen for 100 min. The mixture is cooled, diluted with 40 ml. of benzene, extracted five times with 10 ml. of water and evaporated.

The residue, consisting largely of 3,19-diacetoxyandrosta-2,4,6-trien-17-one, esttrone acetate, and the corresponding 17-enol acetates is dissolved in 80 ml. of ether-tetrahydrofuran 3:2 and left to stand with 9.00 g. of dichlorodicyanoquinone for 1 hour at room temperature, whereupon the mixture is cooled to −5°. Filtration, extraction of the filtrate with water, back extraction of the aqueous phase with ether and evaporation of the combined ethereal phases give a resin containing 19-acetoxy-Δ$^{1,4,6}$-3-ketones. The resin is dissolved in 50 ml. of methanol and left to stand with 1 g. of sodium hydroxide for 1 hour at room temperature whereupon the mixture is neutralized with glacial acetic acid, concentrated to a thick paste, diluted with a small volume of water and filtered yielding a crystalline material consisting largely of 6-dehydroestrone and a smaller amount of estrone. Hydrogenation in 66 ml. of methanol-benzene 1:1 with 0.220 g. of 5% palladium on charcoal followed by filtration, evaporation of the filtrate and recrystallization of the residue from ethanol-ethyl acetate gives estrone M.P. 250–253°, which is identical with an authentic sample.

We claim:
1. 3-acetoxy-6,19-oxidoandrosta-2,4-dien-17-one.
2. 3,19-diacetoxyandrosta-2,4,6-trien-17-one.
3. 3,17,19-triacetoxyandrosta-2,4,6,16-tetraene.
4. The process of preparing estrone which comprises treating 6,19-oxido-4-androstene-3,17-dione with isopropenyl acetate at a temperature ranging from room temperature to the boiling point of the reaction mixture in the presence of an acid catalyst, thereby securing 3-acetoxy-6,19-oxidoandrosta-2,4-dien-17-one, continuing the treatment with isopropenyl acetate in the presence of said acid catalyst, thereby obtaining a reaction mixture which includes 3,19-diacetoxyandrosta-2,4,6-trien-17-one and 3,17,19-triacetoxyandrosta-2,4,6,16-tetraene; treating said mixture with dichlorodicyanoquinone at room temperature, thereby obtaining 19-acetoxyandrosta-1,4,6-triene-3,17-dione; treating said last-named compound with an aromatizing agent selected from acids and bases, thereby obtaining 6-dehydroestrone; and reducing said last-named compound by treatment with hydrogen in the presence of a noble metal catalyst, thereby securing estrone.
5. The process of preparing estrone which comprises heating 6,19-oxido-4-androstene-3,17-dione with isopropenyl acetate in the presence of para-toluene sulfonic acid and cooling the reaction mixture, thereby securing 3 - acetoxy - 6,19 - oxidoandrosta - 2,4 - dien - 17 - one; further heating 3-acetoxy-6,19-oxidoandrosta-2,4-dien-17-one with isopropenyl acetate in the presence of para-toluene sulfonic acid, thereby securing 3,19-diacetoxyandrosta-2,4,6-trien-17-one; treating said last-named compound with dichlorodicyanoquinone, thereby obtaining 19-acetoxyandrosta-1,4,6-triene-3,17-dione; treating said last-named compound with sodium methoxide, thereby securing 6-dehydroestrone; and reducing said last-named compound by treatment with a reducing agent, thereby securing estrone.
6. The process of preparing estrone which comprises heating 6,19-oxido-4-androstene-3,17-dione with isopropenyl acetate in the presence of para-toluene sulfonic acid and cooling the reaction mixture, thereby securing 3 - acetoxy - 6,19 - oxidoandrosta - 2,4 - dien - 17 - one; further heating 3-acetoxy-6,19-oxidoandrosta-2,4-dien-17-one with isopropenyl acetate in the presence of para-toluene sulfonic acid, thereby securing 3,17,19-triacetoxandrosta-2,4,6,16-tetraene; treating said last-named compound with dichlorodicyanoquinone, thereby obtaining 19 - acetoxyandrosta - 1,4,6 - trien - 3,17 - dione; treating said last-named compound with sodium methoxide thereby securing 6-dehydroestrone; and reducing said last-named compound by treatment with a reducing agent, thereby securing estrone.
7. The process which comprises heating 6,19-oxido-4-androstene-3,17-dione with isopropenyl acetate in the presence of an acid catalyst, thereby securing 3-acetoxy-6,19-oxidoandrosta-2,4-dien-17-one; further heating said 3 - acetoxy - 6,19 - oxidoandrosta - 2,4 - dien - 17 - one with isopropenyl acetate in the presence of an acid catalyst, thereby obtaining a reaction mixture which includes estrone acetate, and separating said estrone acetate from the reaction mixture.

References Cited
UNITED STATES PATENTS 3,211,761  10/1965  Wettstein et al. ____ 260—397.4

ELBERT L. ROBERTS, Primary Examiner

U.S. Cl. X.R.

260—397.4; 397.5